United States Patent [19]

Kitami et al.

[11] Patent Number: 4,880,036
[45] Date of Patent: * Nov. 14, 1989

[54] HOSE FOR REFRIGERATING SYSTEMS

[75] Inventors: Tetsu Kitami, Hadano; Jun Mito, Kanagawa, both of Japan

[73] Assignee: The Yokohama Rubber Co., Ltd., Tokyo, Japan

[ * ] Notice: The portion of the term of this patent subsequent to Apr. 26, 1989 has been disclaimed.

[21] Appl. No.: 119,175

[22] Filed: Nov. 10, 1987

[30] Foreign Application Priority Data

Nov. 13, 1986 [JP] Japan .................. 61-268517

[51] Int. Cl.$^4$ .............................................. F16L 9/12
[52] U.S. Cl. ............................ 138/137; 138/125; 138/141; 138/177; 138/DIG. 7; 428/474.7
[58] Field of Search ............. 138/123, 124, 125, 126, 138/127, 172, 141, 137, 177, 178, DIG. 7; 428/36, 474.7, 474.9

[56] References Cited

U.S. PATENT DOCUMENTS

| 3,062,241 | 11/1962 | Brumbach | 138/137 X |
| 3,561,493 | 2/1971 | Maillard et al. | 138/137 X |
| 3,584,656 | 6/1971 | Assendelet et al. | 138/137 X |
| 3,805,848 | 4/1974 | Chrow | 138/137 |
| 4,243,074 | 1/1981 | Strutzel | 138/137 X |
| 4,510,974 | 4/1985 | Natori et al. | 138/137 |
| 4,613,532 | 9/1986 | Michel et al. | 138/DIG. 7 |
| 4,633,912 | 1/1987 | Pilkiazton et al. | 138/137 |
| 4,657,285 | 4/1987 | Skiyama et al. | 138/137 X |
| 4,659,599 | 4/1987 | Strutzel | 138/118.1 X |

Primary Examiner—James E. Bryant, III
Attorney, Agent, or Firm—Finnegan, Henderson, Farabow, Garrett, Dunner

[57] ABSTRACT

A hose for transporting or otherwise handling refrigerants is disclosed which comprises an inner tube, an outer cover and a reinforcing layer disposed therebetween, the inner tube including a resinous inner wall and a rubbery outer peripheral wall. The inner peripheral wall is formed by a selected class of polymers having specified compositions, whereby the hose is rendered highly resistant to gas permeation and stress cracking and highly flexible and moisture-proofing.

3 Claims, 5 Drawing Sheets

HOSE FOR REFRIGERATING SYSTEMS

BACKGROUND OF THE INVENTION

1. Field of the Invention

This invention relates to hoses for transporting or otherwise handling refrigerants.

2. Description of the Prior Art

Prior hoses of this type comprise an inner tube and an outer cover, the inner tube being made up of a polymeric inner wall and a rubbery outer peripheral wall. Certain polymeric materials are known in common use which render the hose highly resistant to Freon gases. These materials include polyamides such as nylon-6, nylon-6/66, nylon-11, nylon-12 and the like.

Other qualities are in many instances desired with respect to flexibility, stress cracking resistance and moisture proofness. However, they vary widely with the type of polyamides used as shown in Table 1. This problem precludes availability of a hose capable of providing a good balance of all such qualities.

SUMMARY OF THE INVENTION

It has now been found that hoses of excellent qualities can be obtained by the use of a selected class of polymeric and rubber materials in forming the inner tubes.

The primary object of the invention is to provide an improved hose for use in refrigerating systems which incorporate structural features to meet with the foregoing requirements.

This and other objects and advantages of the invention will be better understood from the following detailed description taken in connection with the accompanying drawings which illustrate by way of example a preferred embodiment of the invention.

According to the invention, a hose comprises an inner tube including a resinous inner wall and a rubbery outer peripheral wall, a reinforcing layer laminated over the outer peripheral wall, and an outer cover laminated over the reinforcing layer, the inner peripheral wall being formed by a polymeric composition comprising 40-80 wt. % of nylon-6 or nylon-6/66, 5-30 wt. % of nylon-11 and 10-40 wt. % of a polyolefin.

As used herein the following terms have the meanings respectively set forth below: (1) the term nylon 6 refers to polycaprolactam, which can be prepared by thermal polymerization of epsilon-aminocaproic acid; (2) nylon 11 refers to polyaminoundecanamide, which is the self-condensation product of 11-aminoundecanoic acid; and (3) nylon 6/66 refers to a copolymer of nylon 6 and nylon 66. Nylon 66 refers to polyhexamethyleneadipamide, which can be prepared by the condensation of hexamethylenediamine and adipic acid.

The hose according to the invention has the following characteristic features:

1. Great flexibility comparable to a rubber hose.
2. Good gas permeation resistance equal to a nylon-6 inner-walled hose but ten times greater than the rubber hose.
3. High stress cracking resistance exceeding from five to ten times the nylon-6 hose.

DETAILED DESCRIPTION OF THE INVENTION

Figure 1:
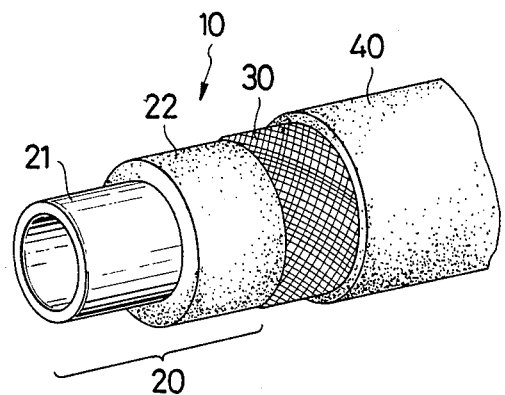
FIG. 1 is a segmentary perspective view of a hose embodying the invention.

Referring to FIG. 1, there is shown a hose 10 provided in accordance with the invention. The hose 10 is a multi-layered structure which comprises an inner tube 20, an outer cover 40 and a reinforcing layer 30 disposed therebetween. The inner tube 20 includes a resinous inner peripheral wall 21 and a rubbery outer peripheral wall 22.

The outer wall 22 may preferably be formed by a class of rubber materials which excel in gas- and moisture-proofness. Specific examples include acrylonitrile-butadiene rubber (NBR), chlorosulfonated polyethylene rubber (CSM), ethylene-propylene-diene rubber (EPDM), butyl rubber (IIR), chlorinated butyl rubber (Cl-IIR) and the like. Particularly preferred are CSM, IIR, Cl-IIR and NBR.

The outer cover 40 may be conveniently formed from the above specified rubbers among which CSM and EPDM are particularly preferred for their high resistance to moisture and to ozone. Materials commonly employed for reinforcement in the art are suitable for the reinforcing layer 30.

According to an important aspect of the invention, the inner wall 21 of the inner tube 20 is formed by a class of polymeric compositions essentially comprising nylon-6, nylon-11 and polyolefin. Eligible examples of the polyolefin include copolymers of different alpha-olefins. The amounts of nylon-6, nylon-11 and polyolefin to be added should in this order be in the range of 40-80 wt. %, preferably 50-70 wt. %, in the range of 5-30 wt. %, preferably 10-25 wt. %, and in the range of 10-40 wt. %, preferably 15-35 wt. %. Departures from these ranges should be avoided to ensure a good balance between gas- and moisture-proofness, stress cracking resistance and flexibility.

The polymeric composition may be combined with other additives such as antioxidants, plasticizers and heat stabilizers. To improve for instance blending and heat resistance, there may be used a plasticizer in an amount of 3-10 wt. % and a heat stabilizer in an amount of 0.03-0.5 wt. %.

An example of the hose dimension according to the invention is as follows:

inner diameter: 11 mm inner wall thickness: 0.05-1.5 mm, preferably, 0.1-1.2 mm outer wall thickness: 0.2-4.5 mm outer cover thickness: 1-5 mm Eligible blend ratios of nylon-6 (N-6) and nylon-11 (N-11) can be determined by various experiments in which a hose is used with an inner tube and a 2.0 mm thick outer cover of CR, the inner tube having a 0.35 mm thick inner wall of N-6/N-11 of varying blend ratios and a 1.65 mm thick outer wall of NBR.

Figure 2:
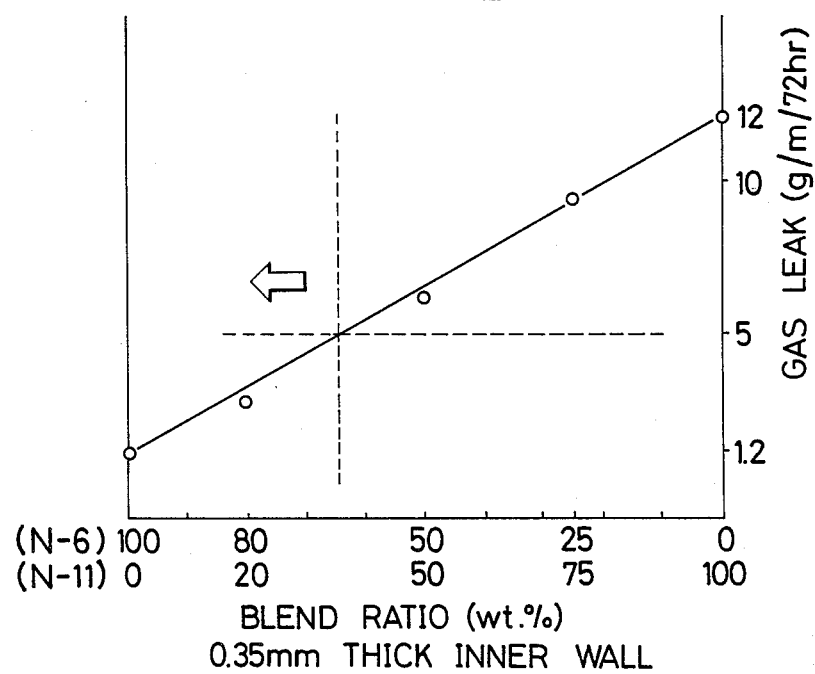
FIGS. 2 through 7 are graphic representations of the correlation between the nylon-6/nylon-11 blend ratios and the gas permeability, stress cracking and flexibility qualities, FIG. 2 showing a blend ratio plotted as against the gas leak, FIG. 3 being plotted against the crack initiation, FIG. 4 being plotted against the bending stress, FIG. 5 being plotted against both gas permeability and stress cracking qualities, FIG. 6 being plotted against the flexibility quality taking the polyolefin content in view, and FIG. 7 being plotted against the gas permeability quality having regard to the nylon-6/nylon-11 blend ratio and the polyolefin content.

The hose may be examined for Freon gas permeation resistance. Rubber hoses must generally have a gas leak between 20 and 25 g/m/72 hr and a cycle of refrigerant replacement of about 2 years. For maintenance-free service, however, a 10-year cycle is required in which instance the gas leak should be less than 5 g/m/72 hr. N-6 and N-11 should to this end be in amounts larger than 65 wt. % and smaller than 35 wt. %, respectively, as shown by the arrow in FIG. 2.

Figure 3:
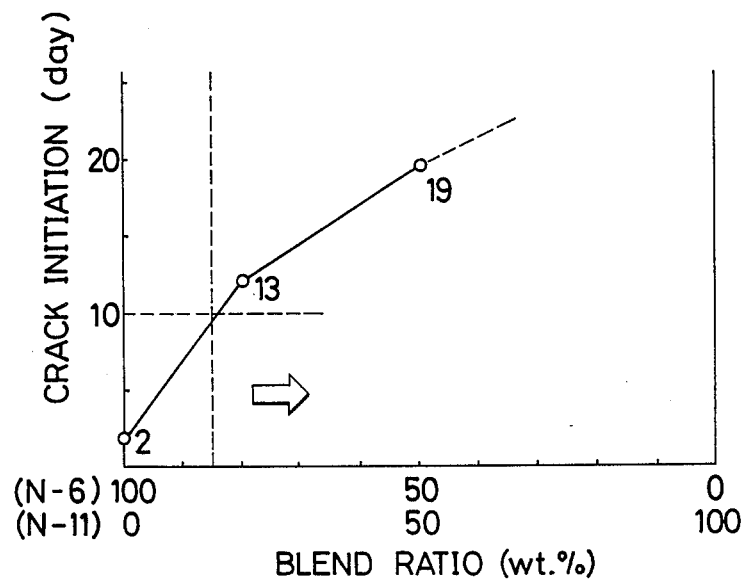

Stress cracking is a phenomenon in which stress cracks would result from exposure to metal ions, particularly a Zn ion, eluted from inside metal conduits or to those present in lubricating oils. Zinc chloride among metal ion chlorides is notoriously sensible for such quality deterioration. Stress cracks usually take place over 2–2.5 days in a hose having an inner wall of N-6 when brought into contact with such a chloride. Maintenance-free service needs prolonged crack resistance exceeding 13 days. To comply with this requirement, larger than 85 wt. % of N-6 and smaller than 15 wt. % of N-11 should be blended as apparent from FIG. 3.

Figure 4:
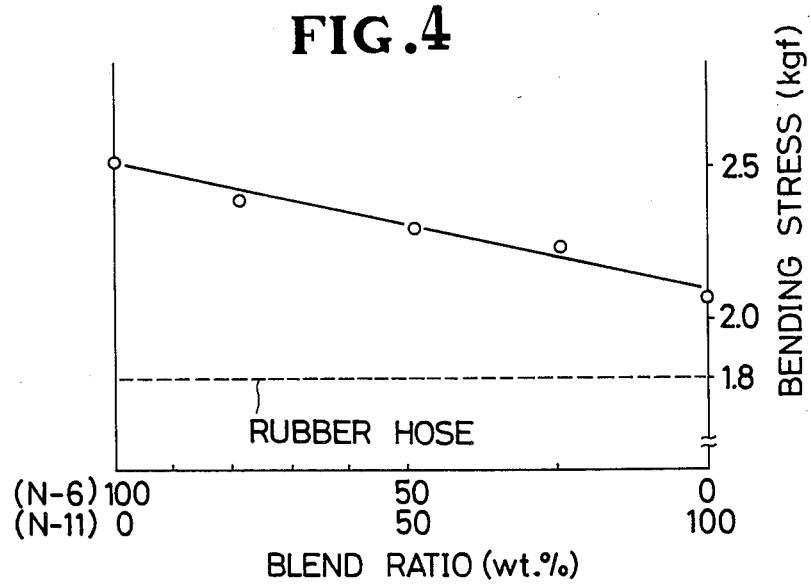

The larger the amount of N-11, the greater flexibility but on a gentle slope as plotted in FIG. 4.

Figure 5:
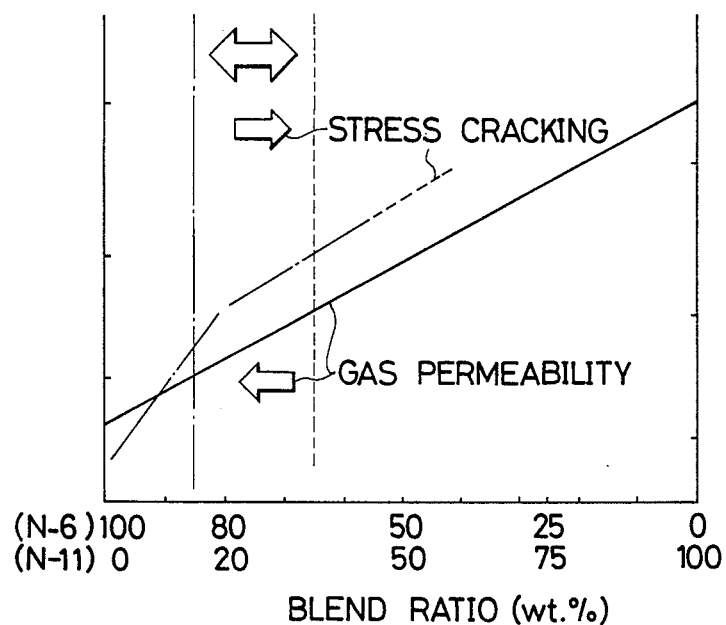

A balance between gas proofness and stress cracking resistance may be confirmed from FIG. 5 in which the double-headed arrow represents the preferred range. N-6 and N-11 should preferably be in their respective ranges of 65–85 wt. % and 15–35 wt. %.

Figure 6:
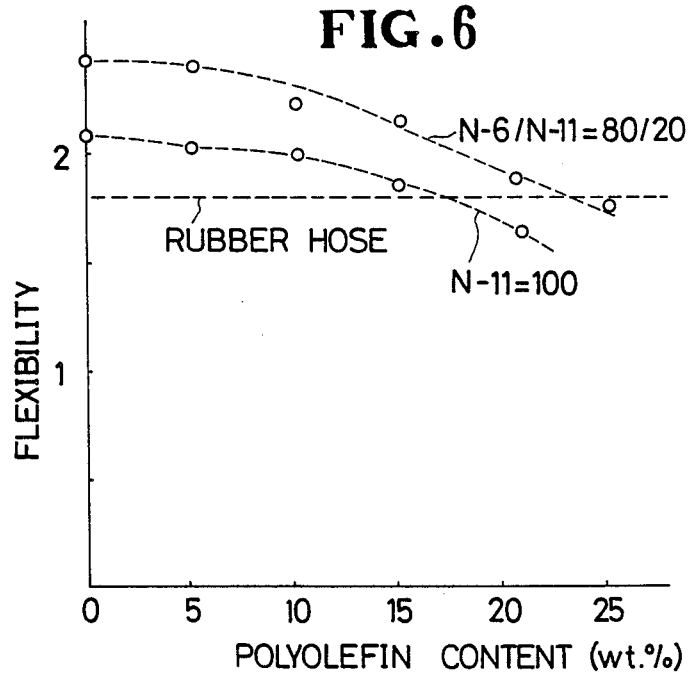

Flexibility grows greater, as shown in FIG. 6, with higher contents of polyolefin, reaching the level of a rubber hose at a content of about 16 wt. % equivalent to 100 wt. % of N-11.

Figure 7:
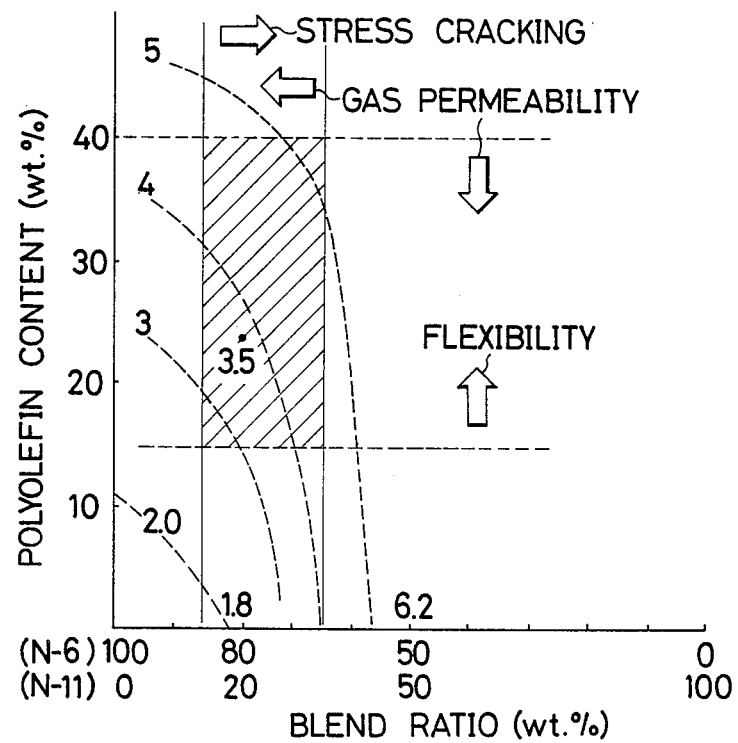

As is apparent from FIG. 7, higher contents than 40 wt. % of polyolefin fail to give sufficient resistance to gas permeation.

Figure 8:
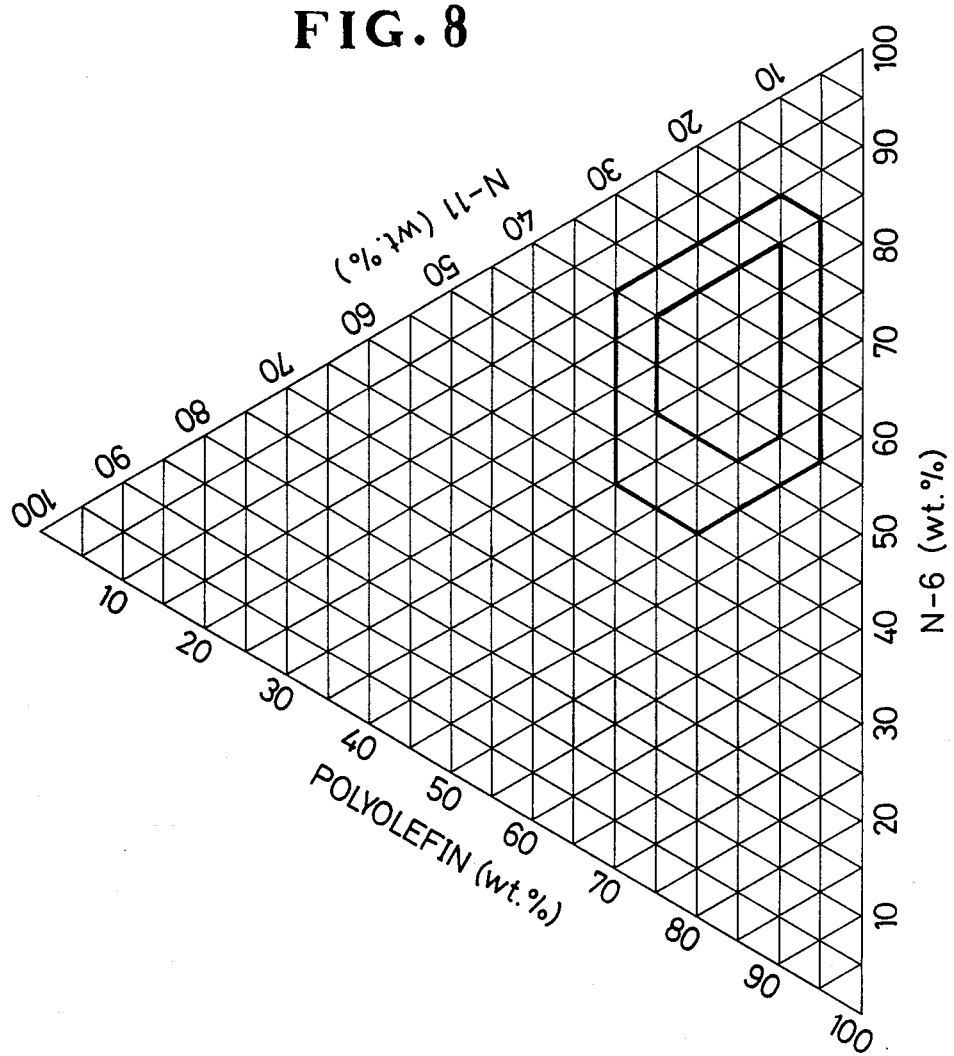
FIG. 8 is a triangular diagram showing the critical ranges of nylon-6, nylon-11 and polyolefin, respectively.

FIG. 8 is taken to show the critical blend ratios of the ternary polymeric compositions contemplated under the invention.

The following examples are provided for a better understanding of the invention, but should not be regarded as limiting the invention.

EXAMPLES 1–26 and Comparative Examples 1–13

Numerous hoses were formulated and produced as shown in Tables 2–6. In these tables, N-6, N-11 and N-12 were commercially available nylon resins given below, and CSM, CR, Cl-IIR, EPDM and NBR were the rubber materials having the following recipes.

N-6: CM 1041, Toray Industries, Inc.
N-11: BESNO TL, Atochem Co.
N-12: AESNO TL, Atochem Co.
CSM:
  CSM: 100 (parts by weight), Hypalon 40, E. I. DuPont De Nemours & Co.
  carbon black: 60, Asahi No. 50, Asahi Carbon Co.
  polyethylene: 3, AC Polyethylene, Allied Chemical Co.
  magnesia: 5
  antioxidant: 1, Nocrac NBC, New Ohuchi Chemical Co.
  plasticizer (DOP): 10, Chisso Petrochemical Co.
  litharge: 5, Yellow No. 1
  accelerator (TRA): 1.5, Sunceller TRA, Sanshin Chemical Industries Co.
CR:
  CR: 100, Neoprene W, Showa Neoprene Co.
  stearic acid: 1
  magnesia: 4
  antioxidant: 2, Antage OD, Kawagushi Chemical Co.
  carbon black: 60, Asahi No. 50, Asahi Carbon Co.
  softener: 10, Fuccol 1150N, Fuji Kosan Co.
  zinc white: 5
  accelerator (TU): 0.75, Sunceller 22, Sanshin Chemical Industries Co.
Cl-IIR:
  Cl-IIR: 100, Chlorobutyl 1066, Esso Chemicals Co.
  carbon black: 80, Asahi No. 50, Asahi Carbon Co.
  stearic acid: 2
  antioxidant: 2, Antage OD, Kawaguchi Chemical Co.
  softener: 5, Machine Oil 22, Fuji Kosan Co.
  magnesia: 1
  zinc white: 5
  accelerator (TS): 2, Sunceller MSPO, Sanshin Chemical Industries Co.
EPDM:
  EPDM: 100, Esprene 305, Sumitomo Chemical Co.
  carbon black: 100, Asahi No. 50, Asahi Carbon Co.
  process oil: 60, Machine Oil 22, Fuji Kosan Co.
  zinc white: 5
  stearic acid: 1
  accelerator (BZ): 2, Soccinol BZ, Sumitomo Chemical Co.
  accelerator (TT): 0.5, Soccinol TT, Sumitomo Chemical Co.
  accelerator (TRA): 0.5, Soccinol TRA, Sumitomo Chemical Co.
  accelerator (M): 1, Soccinol M, Sumitomo Chemical Co.
NBR:
  NBR: 100, Nipol 1042, Nippon Zeon Co.
  carbon black: 80, Asahi No. 50, Asahi Carbon Co.
  zinc white: 5
  stearic acid: 1
  antioxidant: 1, Antage OD, Kawaguchi Chemical Co.
  plasticizer (DOP): 10, Chisso Petrochemical Co.
  accelerator (TS): 1, Sunceller SPO, Sanshin Chemical Industries Co.

The test hoses were examined for gas permeation, stress cracking, flexibility and moisture permeation with the results tabulated.

Tests were made under the conditions given below.

Freon Gas Permeation Test

JRA 2001 of the Japan Refrigerating and Air-conditioning Association was followed. A 45 cm long test hose having metal fittings was charged with Freon gas in an amount of 0.6±0.1 g per cubic centimeter, followed by disposition at 100° C. for 96 hours. Gas permeation resistance was determined by gas leak after a lapse of from 24 to 96 hours and indicated in terms of g/m/72 hr.

Stress Cracking Test

Onto No. 1 dumbbell specimen stipulated in JIS K6301 and resulting from an extruded tube was applied aqueous 50% zinc chloride in droplets. The specimen was disposed still at 100° C. Zinc chloride droplets were repeated at an interval of 24 hours to inspect cracks that took place in the vicinity of droplets on the specimen. Cracking resistance was adjudged by the length of time (day) required for cracks to occur.

Flexibility Test

A test hose was arcutely bent at a bend radius of 10 times its outer diameter, followed by measurement of bending stresses (n=2) ranging in bend radius from 10 to 3 times. Flexibility was determined by bending strength (kgt) read at a bend radius of 4 times from the stress-radius curve.

Moisture Permeation Test

A test hose was placed in an oven at 50° C. for 5 hours and thereafter filled with a desiccant, molecular sieve 3A, to a volume of 80%. The sealed hose was disposed at 50° C. and at 95% RH. The desiccant was weighed at an interval of 120 hours and up to 480 hours. Moisture permeation resistance was determined by weight increases ($mg/cm^2/day$) in the desiccant.

The hoses representing the invention are highly satisfactory in respect of all physical properties tested.

Examples 1-3 show the use of polyolefin of varying contents in an inner wall of a N-6/N-11 (80/20)/polyolefin blend. The larger the amount, the greater flexibility. Controls beyond the specified polyolefin range, Comparative Examples 11 and 12, failed to give sufficient flexibility.

As appears clear from Examples 4-7, less N-11 and less polyolefin give improved gas permeation resistance but show a tendency to reduce stress cracking resistance highly contrastive to the controls of Comparative Examples 1, 7 and 8 in which N-6 alone was used. More N-11 and more polyolefin, Example 7, produce results contrastive to Example 4.

Larger inner wall thicknesses lead to improved resistance to gas permeation and to stress cracking but make the hose less flexible as evidenced by Examples 8-15. A small thickness of 0.1 mm, though relatively high in gas permeation as is in Example 7, has been found sufficient for all practical purposes.

The upper and lower limits of N-6, N-11 and polyolefin have been confirmed to be critical with respect to all physical properties tested as is apparent from Examples 4 and 5, Examples 19 and 20 and Examples 21 and 22. In Example 26 a plasticizer is added to the N-6/N-11/polyolefin blend. Examples 23-25 and Comparative Example 13 are taken to show the use of different rubbers for an outer wall.

Having thus described the invention, it will be apparent to those versed in the art that many changes and modifications may be made to the invention without departing from the scope of the appended claims.

TABLE 1

| Properties | Nylon-6 | Nylon-6/66 | Nylon-11(12) | Rubber |
|---|---|---|---|---|
| Freon gas permeation resistance | ⊙ | ⊙ | X | X |
| flexibility | Δ | Δ | ○ | ⊙ |
| stress cracking resistance | X | X | ○ | — |
| moisture permeation resistance | Δ | Δ | Δ | ⊙ |

⊙: highly excellent
○: superior
Δ: inferior
X: extremely bad

TABLE 2

| Formulations/Properties | Comparative Examples | | | | | | | | | |
|---|---|---|---|---|---|---|---|---|---|---|
| | 1 | 2 | 3 | 4 | 5 | 6 | 7 | 8 | 9 | 10 |
| inner tube inner wall | N-6 | N-11 | N-6/N-11 80/20 | N-6/N-11 50/50 | N-12 | N-6/N-12 80/20 | N-6 | N-6 | N-11 | — |
| thickness (mm) | 0.35 | 0.35 | 0.35 | 0.35 | 0.35 | 0.35 | 0.1 | 1.0 | 1.0 | — |
| outer wall | CSM | CSM | CSM | CSM | CSM | CSM | CSM | CSM | CSM | — |
| thickness (mm) | 1.65 | 1.65 | 1.65 | 1.65 | 1.65 | 1.65 | 1.65 | 1.65 | 1.65 | 2.0 |
| reinforcing layer | | | | | rayon braid | | | | | |
| outer cover | CSM | CSM | CSM | CSM | CSM | CSM | CSM | CSM | CSM | CSM |
| thickness (mm) | 2.0 | 2.0 | 2.0 | 2.0 | 2.0 | 2.0 | 2.0 | 2.0 | 2.0 | 2.0 |
| Freon gas permeation (g/m/72 hr) | 1.2 | 9.8 | 2.9 | 6.2 | 12.3 | 2.9 | 1.1 | 0.9 | 8.4 | 24.0 |
| stress cracking resistance (day) | 2 | more than 38 | 13 | 19 | more than 38 | 12 | 2 | 6 | more than 38 | — |
| flexibility (kgf) | 2.49 | 2.08 | 2.38 | 2.30 | 2.04 | 2.35 | 1.7 | 2.5 | 2.7 | 2.1 |

TABLE 3

| Formulation/Properties | Comparative Examples | | Examples | | |
|---|---|---|---|---|---|
| | 1 | 2 | 1 | 2 | 3 |
| inner tube inner wall composition | | | | | |
| N-6 | 76.2 (80) | 72.5 (80) | 69.6 (80) | 66.6 (80) | 64.0 (80) |
| N-11 | 19.0 (20) | 18.2 (20) | 17.4 (20) | 16.7 (20) | 16.0 (20) |
| polyolefin | 4.8 (5) | 9.1 (10) | 13.0 (15) | 16.7 (20) | 20.0 (25) |
| thickness (mm) | 0.35 | 0.35 | 0.35 | 0.35 | 0.35 |
| outer wall | CSM | CSM | CSM | CSM | CSM |
| thickness (mm) | 1.6 | 1.6 | 1.6 | 1.6 | 1.6 |
| reinforcing layer | | | rayon braid | | |
| outer cover | CSM | CSM | CSM | CSM | CSM |
| thickness (mm) | 2.0 | 2.0 | 2.0 | 2.0 | 2.0 |
| Freon gas permeation (g/m/72 hr) | 2.9 | 2.8 | 2.9 | 3.3 | 3.8 |
| stress cracking resistance (day) | 12 | 12 | 11 | 10 | 10 |
| flexibility (kgf) | 2.21 | 2.16 | 1.88 | 1.79 | 1.75 | composition units: weight percent
parentheses: weight parts

TABLE 4

| Formulations/Properties | Examples | | | | | | | |
|---|---|---|---|---|---|---|---|---|
| | 4 | 5 | 6 | 7 | 8 | 9 | 10 | 11 |
| inner tube inner wall composition | | | | | | | | |
| N-6 | 68.1 (80) | 58.2 (80) | 59.6 (70) | 50.9 (70) | 68.1 (80) | 58.2 (80) | 59.6 (70) | 50.9 (70) |
| N-11 | 17.0 (20) | 14.5 (20) | 25.5 (30) | 21.8 (30) | 17.0 (20) | 14.5 (20) | 25.5 (30) | 21.8 (30) |
| polyolefin | 14.9 (17.5) | 27.3 (37.5) | 14.9 (17.5) | 27.3 (37.5) | 14.9 (17.5) | 27.3 (37.5) | 14.9 (17.5) | 27.3 (37.5) |
| thickness (mm) | 0.10 | 0.10 | 0.10 | 0.10 | 0.35 | 0.35 | 0.35 | 0.35 |
| outer wall | CSM | CSM | CSM | CSM | CSM | CSM | CSM | CSM |
| thickness (mm) | 1.90 | 1.90 | 1.90 | 1.90 | 1.65 | 1.65 | 1.65 | 1.65 |
| reinforcing layer | | | | | rayon braid | | | |
| outer cover | CSM | CSM | CSM | CSM | CSM | CSM | CSM | CSM |
| thickness (mm) | 2.0 | 2.0 | 2.0 | 2.0 | 2.0 | 2.0 | 2.0 | 2.0 |
| Freon gas permeation (g/m/72 hr) | 2.6 | 4.6 | 4.1 | 4.8 | 1.5 | 2.7 | 2.5 | 2.9 |
| stress cracking resistance (day) | 10 | 10 | 11 | 12 | 15 | 14 | 18 | 17 |
| flexibility (kgf) | 1.64 | 1.57 | 1.52 | 1.50 | 1.85 | 1.74 | 1.71 | 1.65 |

TABLE 5

| Formulations/Properties | Examples | | | | | | |
|---|---|---|---|---|---|---|---|
| | 12 | 13 | 14 | 15 | 16 | 17 | 18 |
| inner tube inner wall composition | | | | | | | |
| N-6 | 68.1 (80) | 58.2 (80) | 59.6 (70) | 50.9 (70) | 68.1 (80) | 58.2 (80) | 50.9 (70) |
| N-11 | 17.0 (20) | 14.5 (20) | 25.5 (30) | 21.8 (30) | 17.0 (20) | 14.5 (20) | 21.8 (30) |
| polyolefin | 14.9 (17.5) | 27.3 (37.5) | 14.9 (17.5) | 27.3 (37.5) | 14.9 (17.5) | 27.3 (37.5) | 27.3 (37.5) |
| thickness (mm) | 1.0 | 1.0 | 1.0 | 1.0 | 1.0 | 1.0 | 1.0 |
| outer wall | CSM | CSM | CSM | CSM | CSM | CSM | CSM |
| thickness (mm) | 1.90 | 1.90 | 1.90 | 1.90 | 1.65 | 1.65 | 1.65 |
| reinforcing layer | | | | rayon braid | | | |
| outer cover | CSM | CSM | CSM | CSM | CSM | CSM | CSM |
| thickness (mm) | 2.0 | 2.0 | 2.0 | 2.0 | 2.0 | 2.0 | 2.0 |
| Freon gas permeation (g/m/72 hr) | 0.4 | 0.7 | 0.7 | 0.8 | 0.3 | 0.4 | 0.3 |
| stress cracking resistance (day) | 35 | 33 | more than 38 | more than 38 | 30 | 28 | 30 |
| flexibility (kgf) | 2.00 | 1.91 | 1.88 | 1.82 | 2.00 | 1.95 | 1.97 |

TABLE 6

| Formulations/Properties | Examples | | | | | | | | | Comparative Example 13 |
|---|---|---|---|---|---|---|---|---|---|---|
| | 19 | 20 | 21 | 22 | 26 | 23 | 24 | 25 | 9 | |
| inner tube inner wall composition | | | | | | | | | | |
| N-6 | 40 | 40 | 50 | 65 | 55.0 | 58.2 | 58.2 | 58.2 | 58.2 | 58.2 |
| N-11 | 30 | 20 | 15 | 10 | 13.7 | 14.5 | 14.5 | 14.5 | 14.5 | 14.5 |
| polyolefin | 30 | 40 | 35 | 35 | 25.8 | 27.3 | 27.3 | 27.3 | 27.3 | 27.3 |
| plasticizer | — | — | — | — | 5.5 | — | — | — | — | — |
| thickness (mm) | 0.35 | 0.35 | 0.35 | 0.35 | 0.35 | 0.35 | 0.35 | 0.35 | 0.35 | 0.35 |
| outer wall | CSM | CSM | CSM | CSM | CSM | Cl-IIR | NBR | NBR | CSM | NBR |
| thickness (mm) | 1.65 | 1.65 | 1.65 | 1.65 | 1.65 | 1.65 | 1.65 | 1.65 | 1.65 | 2.0 |
| reinforcing layer | | | | | | rayon braid | | | | |
| outer cover | CSM | CSM | CSM | CSM | CSM | Cl-IIR | CSM | EPDM | CSM | CR |
| thickness (mm) | 2.0 | 2.0 | 2.0 | 2.0 | 2.0 | 2.0 | 2.0 | 2.0 | 2.0 | 2.0 |
| Freon gas permeation (g/m/72 hr) | 4.9 | 5.0 | 4.8 | 4.8 | 2.8 | 2.7 | 2.7 | 2.7 | 2.7 | 24.0 |
| stress cracking resistance (day) | 13 | 13 | 12 | 11 | 14 | 14 | 14 | 14 | 14 | — |
| flexibility (kgf) | 1.42 | 1.43 | 1.50 | 1.60 | 1.72 | 1.72 | 1.72 | 1.76 | 1.74 | 2.1 |
| moisture permeation (50° C. × 95% RH) | — | — | — | — | — | 0.21 | 0.36 | 0.48 | 0.28 | 0.60 |

What is claimed is:

1. A hose suitable for use in transporting refrigerants comprising an inner tube including a resinous inner peripheral wall and a rubbery outer peripheral wall, a reinforcing layer laminated over said outer peripheral wall, and an outer cover laminated over said reinforcing layer, said inner peripheral wall being formed by a polymeric composition comprising 40-80 percent by weight of nylon-6 or nylon-6/66, 5-30 percent by weight of nylon-11 and 10-40 percent by weight of a polyolefin, said hose having an improved balance of flexibility, resistance to stress cracking and resistance to gas permeation rendering it suitable for use in refrigerating systems.

2. A hose according to claim 1 wherein said outer peripheral wall is formed by a member selected from the group consisting of acrylonitrile-butadiene rubber, chlorosulfonated polyethylene rubber, ethylene-propylenediene rubber, butyl rubber and chlorinated butyl rubber.

3. A hose according to claim 1 wherein said inner peripheral wall has a thickness in the range of 0.05-1.5 mm, and said outer peripheral wall has a thickness in the range of 0.2-4.5 mm.

* * * * *

UNITED STATES PATENT AND TRADEMARK OFFICE
CERTIFICATE OF CORRECTION

PATENT NO. : 4,880,036

DATED : November 14, 1989

INVENTOR(S) : Tetsu KITAMI and Jun MITO

It is certified that error appears in the above-identified patent and that said Letters Patent is hereby corrected as shown below:

On the title page, the following notice should be deleted:
[*] Notice: The portion of the term of this patent subsequent to Apr. 26, 1989 has been disclaimed."

Signed and Sealed this

Third Day of November, 1992

*Attest:*

DOUGLAS B. COMER

*Attesting Officer*      *Acting Commissioner of Patents and Trademarks*